Figure 1:
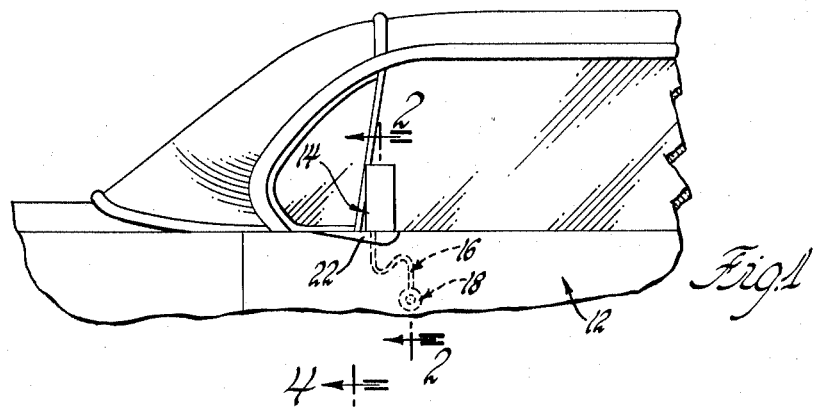

May 17, 1966     L. T. FUQUA     3,251,238
REMOTELY CONTROLLED REAR VIEW MIRROR
Filed Oct. 4, 1963     2 Sheets-Sheet 1

INVENTOR.
Lloyd T. Fuqua
BY
W. F. Wagner
ATTORNEY

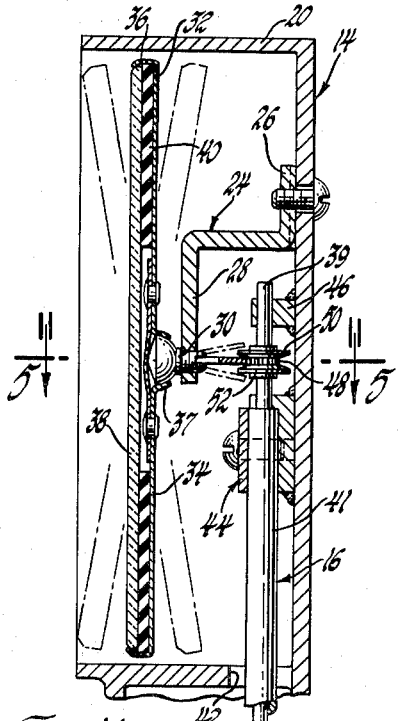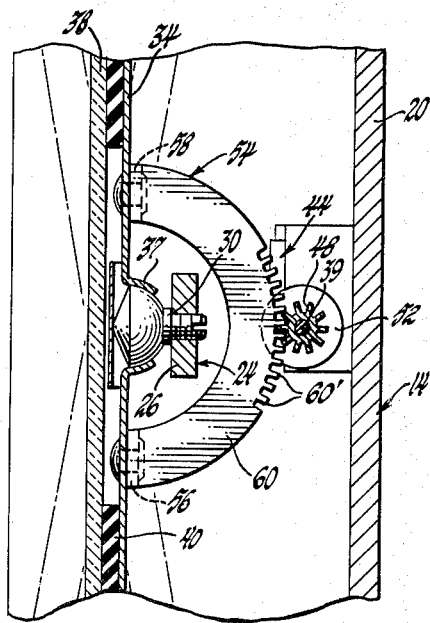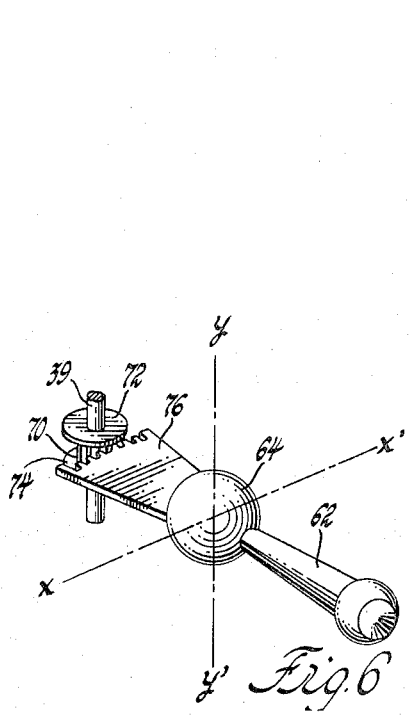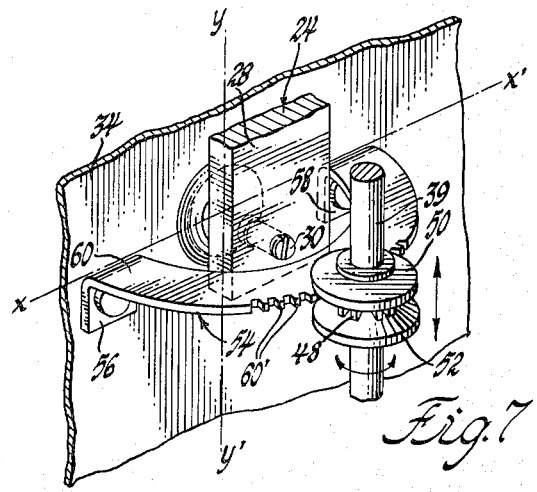

United States Patent Office 3,251,238
Patented May 17, 1966

3,251,238
REMOTELY CONTROLLED REAR VIEW MIRROR
Lloyd T. Fuqua, Fortville, Ind., assignor to General Motors Corporation, Detroit, Mich., a corporation of Delaware
Filed Oct. 4, 1963, Ser. No. 314,005
6 Claims. (Cl. 74—501)

This invention concerns a rear view mirror assembly having an improved operating mechanism that utilizes a single flexible cable for transmitting drive from a lever-type actuator to a remotely located mirror.

Many outside rear view mirrors presently found on automobiles are of the remotely controlled type in which the mirror is mounted on the front fender or door and connected through appropriate mechanism to an actuator supported interiorly on the door or instrument panel within reach of the driver. In mirror devices of this type, one form of actuator which has gained wide acceptance by vehicle drivers includes a lever having one end thereof pivotally mounted in a support and connected through two or more flexible cables to the mirror in a manner which permits sidewise, up-and-down, and other movement of the lever's free end to result in corresponding movement of the mirror. As should be apparent, an actuator of this sort is very desirable from the driver's standpoint because it permits the mirror to be readily adjusted with little prior thought required as to what position the mirror will assume in response to movement of the lever. In contradistinction, the rotary and push-pull type actuators require a certain amount of familiarity before the operator is able to correlate the actuator movement with the mirror movement because one movement is not related in direction to the other.

Although the lever-type actuator simplifies the operation of a remotely controlled mirror, one difficulty has been that until this invention it has been associated with two or more cables for transmitting drive to the mirror. As a result, in many instances, the mirror positioning mechanism has been complicated in design and therefore expensive to assemble and manufacture.

Accordingly, this invention contemplates a simple and inexpensive remotely controlled rear view mirror assembly in which the actuator is supported for pivotal movement about a plurality of axes and is connected to the mirror in a manner which permits both the actuator and mirror to move in the same direction with respect to the associated portion of the cable. This is accomplished with a mirror assembly comprising a first and second housing adapted to be respectively mounted interiorly and exteriorly of the automotive vehicle. A mirror support is pivotally supported in the first housing while the second housing pivotally mounts a lever that is connected to the mirror through a single flexible cable. The opposite ends of the cable are supported in the respective housings for rotation and axial movement, and means operatively connect the cable with the mirror support and lever so that pivotal movement of the latter about a first axis causes the cable to rotate and move the mirror support about a vertical axis while pivotal movement of the lever about a second axis perpendicular to the first axis causes axial movement of the cable to pivot the mirror support about a horizontal axis while pivotal movement of the lever about axes located between the first and second axes causes concomitant rotative and axial movement of the cable to pivot the mirror support about axes located between the horizontal and vertical axes.

Figure 2:
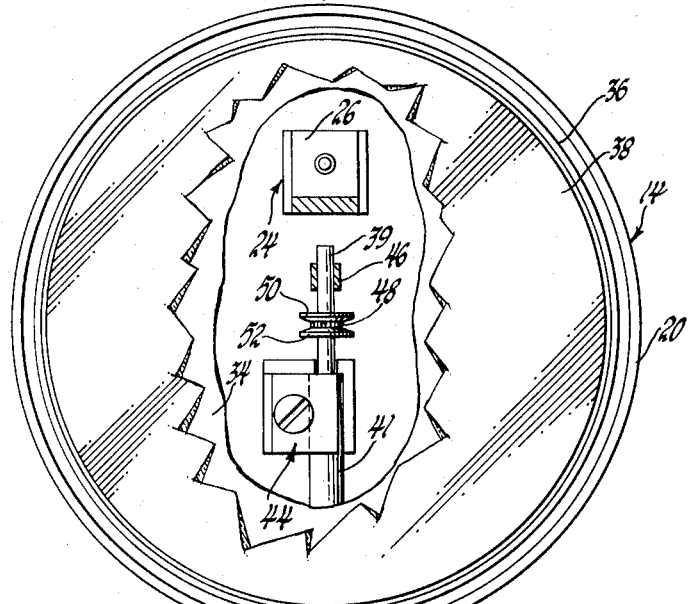
Figure 2:
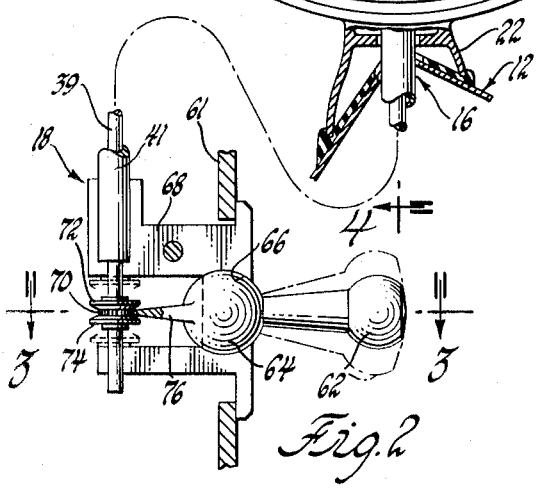
Figure 3:
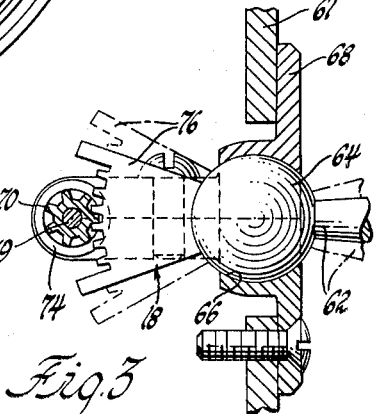

A more complete understanding of the invention can be derived from the following detailed description when taken in conjunction with the drawings in which:

FIGURE 1 is a fragmentary view showing an automotive vehicle mounting a rear view mirror assembly made in accordance with the invention, FIGURE 2 is an enlarged view of the rear view mirror assembly taken on lines 2—2 of FIGURE 1, FIGURE 3 is a view taken on lines 3—3 of FIGURE 2, FIGURE 4 is a sectional view taken on lines 4—4 of FIGURE 2, FIGURE 5 is an enlarged sectional view taken on lines 5—5 of FIGURE 4, FIGURE 6 is an isometric view illustrating the actuator connected with the operating cable of the mechanism, and FIGURE 7 is an isometric view showing the one end of the cable associated with the mirror support.

Referring now to FIGURE 1, a rear view mirror assembly made in accordance with the invention is shown mounted on a vehicle door 12 and comprising an exterior mirror portion 14 connected through a flexible cable 16 to an actuator 18 located interiorly of the vehicle. As should be apparent and if preferred, the mirror portion can be mounted on the front fender of the vehicle with the actuator positioned on the instrument panel. However, in either case it is important to have the actuator located so that it is within easy reach of the driver and, although not necessary, preferably in a position where the operating lever normally points towards the driver. The reason for the latter arrangement will become more apparent as the description of this invention proceeds.

As viewed in FIGURES 2 and 4, the mirror portion 14 comprises a cup-shaped housing 20, the lower portion of which is integrally formed with a bracket 22 that secures the housing to the sheet metal of the vehicle door 12. As best seen in FIG. 2, a Z-shaped bracket 24 has one leg 26 thereof rigidly fixed to the housing while the other leg 28 supports a ball stud 30 which in turn carries a mirror support 32. The mirror support comprises a disk-like sheet metal base 34 having the peripheral portions 36 thereof spun about a mirror element 38 for supporting the latter against an annular pad 40. The central portion of the base 34 is formed as a socket 37 that accommodates the ball portion of the ball stud so as to permit the mirror support to be universally adjusted thereabout in a manner to be described.

The operating mechanism for positioning the mirror support about the ball stud includes the actuator 18 which, as aforementioned, is connected to the mirror portion 14 through the cable 16. The cable takes the form of a conventional Bowden wire which comprises a wire or shaft portion located within a sheath portion both of which are respectively identified by the numerals 39 and 41. One end of the cable extends into the housing 22 through an opening 42 and has the sheath portion fixed from movement by a clamping arrangement 44 while the wire portion is rotatably and slidably supported by an extension 46 projecting axially from the housing. A pinion 48 is fixed to the wire portion of the cable and is rigidly formed with a pair of disc members 50 and 52 each of which extends radially a distance so as to form a pocket for accommodating a portion of a C-shaped member 54 secured to the mirror support. As seen in FIGS. 5 and 7, the member 54 has the leg portions thereof formed with depending flanges 56 and 58 which are riveted to the base 34 so as to locate the body 60 in a plane substantially normal to the plane of the mirror support and midway between the ends thereof. A portion of the outer periphery of the member 54 is formed with a plurality of gear teeth 60' which engage the gear teeth of the pinion 48.

Referring now to FIGS. 2 and 6, the actuator 18 is shown secured to the trim panel 61 and comprising an operating lever 62 having a ball portion 64 which is supported in a spherical seat 66 formed in a housing 68. The actuator end of the Bowden cable has the sheath and wire portions thereof supported in the same manner as the corresponding opposite ends are supported in the housing 22. In addition, a pinion 70 is rigid with the wire portion and includes a pair of similar disc members 72 and 74 fixed to the opposite sides of the pinion. A segment gear 76 extends from the ball portion 64 in axial alignment with the operating lever 62 and into engagement with the gear teeth of the pinion 70.

For all practical purposes, it should be noted, the construction of the actuator 18 is basically the same as that of the operating mechanism positioned in the mirror portion 12, except that the operating lever 62 has been substituted for the mirror support 32. Because of this arrangement, movement of the operating lever 62 in a certain direction results in movement of the mirror support 32 in a corresponding direction. This can be best understood by referring to FIGURES 6 and 7 wherein the operating mechanism of the actuator 18 and mirror portion are shown isometrically. In each instance the $x, x'$ axis corresponds to a horizontal axis and the $y, y'$ axis to a vertical axis. Now assuming that the operating lever 62 is moved upwardly in a vertical plane passing through the $y, y'$ axis the lower portion of the segment gear 76 will engage disc 74 and thereby cause movement of the wire portion 38 in a downward direction. Similarly, the pinion 48 will be moved downwardly with the result that the disc member 50 will engage the upper portion of the member 54 and cause the upper portion of mirror support 32 to pivot rearwardly about the $x, x'$ axis. As should be apparent, downward movement of the operating lever in the vertical plane would cause the segment gear to contact and raise the disc member 72 with corresponding movement occurring to pinion 48. Thus, through the disc member 52, the member 54 and the associated mirror support would again be tilted about the $x, x'$ axis, however, in this instance the upper portion of the mirror support would move forwardly.

When the operating lever is moved sideways in a horizontal plane about the $y, y'$ axis, the segment gear rotates and causes the pinion 70, wire portion 38, and pinion 48 to rotate and result in the member 54 being moved so as to position the mirror support about the $y, y'$ axis passing through the ball and socket connection. Moreover, should the operating lever be shifted to a position between the horizontal axis and vertical axis, for example, into one of the quadrants defined by the $x, x'$ and $y, y'$ axes this movement will cause the wire portion 39 to be shifted and rotated simultaneously and result in the mirror support being moved about an axis passing between the axes.

From the above it should be apparent that any positioning of the operating lever with respect to the $y, y'$ and the $x, x'$ axes results in corresponding positioning of the mirror support with respect to the same axis. This is accomplished by an operating mechanism that utilizes a single flexible cable connected between the actuator and the mirror to be adjusted.

It should be understood that changes and modifications that can be made in the above-described mirror assembly within the spirit of the invention are contemplated, and therefore I do not wish to be limited except by the scope of the appended claims.

What is claimed is:

1. A rear view mirror mechanism comprising a first fixed housing, a mirror support universally pivotally supported by said first housing, a second fixed housing located remotely from said first housing, an operating lever universally pivotally supported by said second housing, a single flexible shaft having the opposite ends thereof supported by the first and second housings for rotation and slidable movement, means connecting the shaft portion located in the first housing with said mirror support so that rotation of said shaft causes the mirror support to pivot about a first axis while sliding movement of the shaft causes the mirror support to pivot about a second axis which is perpendicular to said first axis, and means operatively connecting the shaft portion located in the second housing with said operating lever so that said shaft can be selectively and simultaneously rotated and shifted along its longitudinal axis for adjusting the mirror support about said first and second axes and about axes located between said first and second axes.

2. A rear view mirror mechanism comprising a first fixed housing, a mirror support universally pivotally supported by said first housing, a second fixed housing located remotely from said first housing, an operating lever universally pivotally supported by said second housing, a single flexible shaft having the opposite ends thereof supported by the first and second housings for rotation and slidable movement, gear means connecting the shaft portion located in the first housing with said mirror support so that rotation of said shaft causes the mirror support to pivot about a first axis while sliding movement of the shaft causes the mirror support to pivot about a second axis which is perpendicular to said first axis, and gear means operatively connecting the shaft portion located in the second housing with said operating lever so that said shaft can be selectively and simultaneously rotated and shifted along its longitudinal axis for adjusting the mirror support about said first and second axes and about axes located between said first and second axes.

3. A rear view mirror mechanism comprising a first housing, a mirror support, means universally pivotally supporting said mirror support in said housing, a member fixed to the rear of said mirror support, a plurality of gear teeth formed on the member, a second housing located remotely from said first housing, an operating lever universally pivotally supported in said housing, a flexible shaft having the opposite ends thereof supported in the first and second housing for rotation about and axial movement along the longitudinal axis of said shaft, a first pinion rigidly secured to the shaft portion located in the first housing and engaging the gear teeth of the member, a second pinion rigidly secured to the shaft portion located in the second housing, and a segment gear secured to the operating lever and engaging the second pinion so that pivotal movement of the operating lever about a first axis causes the shaft to rotate and move the mirror support about a vertical axis while pivotal movement of the operating lever about a second axis perpendicular to said first axis causes the shaft to move axially along its longitudinal axis to pivot the mirror support about a horizontal axis and pivotal movement of the operating lever about axes located between said first and second axes causes concomitant rotative and axial movement of the shaft to pivot the mirror support about axes located between said horizontal and vertical axes.

4. A rear view mirror mechanism comprising a first housing, a mirror support, means universally pivotally supporting said mirror support in said housing, a C-shaped member having the opposite ends thereof fixed to the rear of said mirror support, a plurality of gear teeth formed on the periphery of the C-shaped member, a second housing located remotely from said first housing, an operating lever universally pivotally supported in said second housing, a flexible shaft having the opposite ends thereof supported in the first and second housing for rotation about and axial movement along the longitudinal axis of said shaft, a first pinion rigidly secured to the shaft portion located in the first housing and engaging the gear teeth of the C-shaped member, a second pinion gear rigidly secured to the shaft portion located in the second housing, and a segment gear secured to the operating lever and engaging the second pinion so that pivotal movement of the operating lever about a first axis causes the shaft to rotate and move the mirror support about a vertical axis while pivotal movement of the operating lever about a second axis perpendicular to said first axis causes the shaft to move axially along its longitudinal axis to pivot the mirror support about a horizontal axis and pivotal movement of the operating lever about axes located between said first and second axes causes concomitant rotative and axial movement of the shaft to pivot the mirror support about axes located between said horizontal and vertical axes.

5. A rear view mirror mechanism comprising a first housing, a mirror support, means universally pivotally supporting said mirror support in said housing, a C-shaped member having the opposite ends thereof fixed to the rear of said mirror support and being located in a horizontal plane passing through said pivotal means, a plurality of gear teeth formed on the periphery of the C-shaped member, a second housing located remotely from said first housing, an operating lever universally pivotally supported in said second housing, a flexible shaft having the opposite ends thereof supported in the first and second housing for rotation about and axial movement along its longitudinal axis of said shaft, a first pinion rigidly secured to the shaft portion located in the first housing and engaging the gear teeth of the C-shaped member, a second pinion gear rigidly secured to the shaft portion located in the second housing, and a segment gear secured to the operating lever and engaging the second pinion, each of said pinions having radially extending portions adapted to engage opposite sides of the C-member and the segment gear respectively so that pivotal movement of the operating lever about a first axis causes the both pinions to rotate and move the mirror support about a vertical axis while pivotal movement of the operating lever about a second axis perpendicular to said first axis causes both pinions to shift along the longitudinal axis of the cable to pivot the mirror support about a horizontal axis and pivotal movement of the operating lever about axes located between said first and second axes causes concomitant rotative and shifting movement of the pinions to pivot the mirror support about axes located between said horizontal and vertical axes.

6. A rear view mirror mechanism comprising a first fixed housing, a mirror support universally pivotally supported by said first housing, a second fixed housing located remotely from said first housing, an operating lever universally pivotally supported by said second housing, a single flexible cable comprising a sheath portion and a wire portion, the opposite ends of the sheath portion fixedly supported by the first and second housings respectively, means connecting one end of the wire portion with said mirror support so that rotation of said wire portion about its longitudinal axis causes the mirror support to pivot about a first axis while axial movement of the wire portion causes the mirror support to pivot about a second axis which is substantially perpendicular to said first axis, and means connecting the other end of said wire portion with said operating lever so that said wire portion can be simultaneously rotated and shifted along its longitudinal axis by pivotal movement of the operating lever in a single plane whereby said mirror support is adjusted about said first and second axis and about axes located between said first and second axes.

References Cited by the Examiner

UNITED STATES PATENTS

| | | | |
|---|---|---|---|
| 948,155 | 2/1910 | Baldwin | 74—507 |
| 1,320,339 | 10/1919 | Norby | 74—501 X |
| 1,721,454 | 7/1929 | Kleinert. | |
| 2,185,012 | 12/1939 | Blazier | 74—501 X |
| 2,568,270 | 9/1951 | Butkiewicz. | |
| 2,614,437 | 10/1952 | Meggitt | 74—507 X |
| 2,962,933 | 12/1960 | Hezler | 88—93 |

BROUGHTON G. DURHAM, *Primary Examiner.*

C. F. GREEN, *Assistant Examiner.*